US006973171B2

(12) United States Patent
Ljubicich et al.

(10) Patent No.: US 6,973,171 B2
(45) Date of Patent: Dec. 6, 2005

(54) TECHNIQUE FOR ANALYZING INFORMATION ASSISTANCE CALL PATTERNS

(75) Inventors: Philip A. Ljubicich, Lake Forest Park, WA (US); Matthew A. Mostad, Kenmore, WA (US)

(73) Assignee: Metro One Telecommunications, Inc., Beaverton, OR (US)

( * ) Notice: Subject to any disclaimer, the term of this patent is extended or adjusted under 35 U.S.C. 154(b) by 226 days.

(21) Appl. No.: 10/423,774

(22) Filed: Apr. 25, 2003

(65) Prior Publication Data

US 2004/0213389 A1    Oct. 28, 2004

(51) Int. Cl.$^7$ .................... H04M 15/00; H04M 3/00; H04M 5/00
(52) U.S. Cl. ................. 379/112.06; 379/133; 379/134; 379/135; 379/139; 379/266.07
(58) Field of Search .................. 379/111, 112.01, 379/112.06, 133–134, 137, 139, 141, 112.07; 705/14; 707/1, 7, 9–10, 102, 200

(56) References Cited

U.S. PATENT DOCUMENTS

| | | | | |
|---|---|---|---|---|
| 5,903,635 A | * | 5/1999 | Kaplan | 379/112.01 |
| 6,470,079 B1 | * | 10/2002 | Benson | 379/114.13 |
| 6,760,727 B1 | * | 7/2004 | Schroeder et al. | 707/10 |
| 6,829,348 B1 | * | 12/2004 | Schroeder et al. | 379/265.09 |
| 2002/0160766 A1 | * | 10/2002 | Portman et al. | 455/422 |
| 2002/0161627 A1 | * | 10/2002 | Gailey et al. | 705/10 |
| 2002/0161647 A1 | * | 10/2002 | Gailey et al. | 705/14 |
| 2004/0179672 A1 | * | 9/2004 | Pagel et al. | 379/266.1 |
| 2005/0089155 A1 | * | 4/2005 | Isenberg | 379/266.01 |

\* cited by examiner

Primary Examiner—Binh K. Tieu
(74) Attorney, Agent, or Firm—Kaye Scholer LLP

(57) ABSTRACT

The invention is directed to assessing the viability of a business entity based on statistics concerning information assistance calls requesting the listing of the same. The invention is premised upon a perceived correlation between the number of calls requesting a business entity's listing and the callers' interest in its products or services, which in turn correlates to sales of the business entity. In accordance with the invention, data is collected and analyzed which concerns information assistance calls requesting listings of different business entities which may belong to the same industry or company to measure their comparative performance. In an illustrative embodiment, the performance measure of the business entity (department) may be compared with those of other business entities (departments) in the same geographic area belonging to the same industry to gain insights into the competitiveness of the business entity in that area. Management of the business entity (department) may then be able to change an advertising campaign based on such insights.

57 Claims, 8 Drawing Sheets

| | 210 | 215 | 220 | 225 | 230 | 235 | 240 |
|---|---|---|---|---|---|---|---|
| | TYPE OF BUSINESS | SIC | NAME OF COMPANY | ADDRESS OF COMPANY | DISTANCE BETWEEN BUSINESS ENTITIES | TOTAL WEEKLY CALLS | PERCENTAGE OF TOTAL WEEKLY CALLS |
| 270 | CLOTHING | 5311 | FINLEY BOUTIQUE | 253 ROOSEVELT AVE. JACKSON HEIGHTS NY 11372 | 5.7 | 3,547 | 2.0% |
| 271 | CLOTHING | 5311 | BANANA REPUBLIC | 53-01 NORTHERN BLVD. LONG ISLAND CITY, NY 11320 | 3.3 | 7,840 | 4.4% |
| 274 | CLOTHING | 5311 | GAP KIDS | 119-11 108 ST. REGO PARK, NY 11398 | 9.1 | 3,710 | 2.1% |
| 277 | CLOTHING | 5311 | HUDSONS | 201-32 ROBINSON ROAD BAYSIDE, NY 11020 | 5.2 | 4,497 | 2.5% |
| 278 | CLOTHING | 5311 | ABC CLOTHING STORE | 180-12 153rd ST. FLUSHING MEADOWS, NY 11375 | 0 | 28,989 | 16.3% |
| | ⋮ | ⋮ | ⋮ | ⋮ | ⋮ | ⋮ | ⋮ |
| 294 | | | TOTAL | | | 178,322 | 100% |

| | 210 | 215 | 220 | 225 | 230 | 235 | 240 |
|---|---|---|---|---|---|---|---|
| | TYPE OF BUSINESS | SIC | NAME OF COMPANY | ADDRESS OF COMPANY | DISTANCE BETWEEN BUSINESS ENTITIES | TOTAL WEEKLY CALLS | PERCENTAGE OF TOTAL WEEKLY CALLS |
| 270 | CLOTHING | 5311 | FINLEY BOUTIQUE | 253 ROOSEVELT AVE. JACKSON HEIGHTS NY 11372 | 5.7 | 3,547 | 2.0% |
| 271 | CLOTHING | 5311 | BANANA REPUBLIC | 53-01 NORTHERN BLVD. LONG ISLAND CITY, NY 11320 | 3.3 | 7,840 | 4.4% |
| 274 | CLOTHING | 5311 | GAP KIDS | 119-11 108 ST. REGO PARK, NY 11398 | 9.1 | 3,710 | 2.1% |
| 277 | CLOTHING | 5311 | HUDSONS | 201-32 ROBINSON ROAD BAYSIDE, NY 11020 | 5.2 | 4,497 | 2.5% |
| 278 | CLOTHING | 5311 | ABC CLOTHING STORE | 180-12 153rd ST. FLUSHING MEADOWS, NY 11375 | 0 | 28,989 | 16.3% |
| | ... | ... | ... | ... | | ... | ... |
| 294 | | | TOTAL | | | 178,322 | 100% |

FIG. 3
300

| | TIME OF CALL | DATE OF CALL | PHONE NUMBER OF LISTING ~320 | NAME OF LISTING ~325 | CALLER'S ANI ~330 | |
|---|---|---|---|---|---|---|
| 350 ~ | 9:03 am | 2/24/93 | 718 635-5301 | ABC CLOTHING STORE | 212 836-7188 | ⋮ |
| 351 ~ | 9:08 am | 2/24/93 | 718 839-5401 | ADVANCE AUTO | 718 779-6503 | ⋮ |
| 353 ~ | 11:54 am | 2/24/93 | 718 635-5302 | ABC CLOTHING STORE | 201 259-3671 | ⋮ |
| 354 ~ | 2:36 pm | 2/24/93 | 718 891-1819 | ABC CLOTHING STORE | 347 746-0915 | ⋮ |
| | ... | ... | ... | ... | ... | ... |
| 360 ~ | 3:48 pm | 12/22/93 | 617 384-0500 | AAMCO TRANSMISSIONS | 617 539-8900 | ⋮ |
| 361 ~ | 5:47 pm | 12/24/93 | 617 384-0500 | AAMCO TRANSMISSIONS | 347 446-5901 | ⋮ |
| 362 ~ | 1:04 pm | 12/29/93 | 617 384-8976 | CITGO | 617 687-1245 | ⋮ |
| 363 ~ | 11:24 am | 12/30/93 | 619 236-1203 | AAMCO TRANSMISSIONS | 619 806-1807 | ⋮ |

| 510 | 515 | 518 | 520 | 525 | 527 | 530 | 535 | 540 | 545 | 550 | 555 |
|---|---|---|---|---|---|---|---|---|---|---|---|
| SIC | NAME OF ENTITY | DEPARTMENT | ADDRESS OF ENTITY | PHONE NUMBER | POINTER | MONDAY CALLS 8-11am | MONDAY CALLS 11am-2pm | MONDAY CALLS 2pm-5pm | TOTAL MONDAY CALLS | TOTAL WEEKDAY CALLS | TOTAL WEEKLY CALLS |
| 5311 | ABC CLOTHING STORE | GENERAL | 180-12 153rd STREET | 718 635-5300 | MEMORY ADDRESS 1 | 3 | 70 | 231 | 304 | 1,598 | 3,569 |
| 5311 | ABC CLOTHING STORE | SHOES | 180-12 153rd STREET | 718 635-5301 | MEMORY ADDRESS 2 | 59 | 102 | 9 | 170 | 900 | 1,054 |
| 5311 | ABC CLOTHING STORE | MEN'S CLOTHING | 180-12 153rd STREET | 718 635-5302 | MEMORY ADDRESS 3 | 179 | 309 | 651 | 1,139 | 5,023 | 6,124 |
| ... | ... | ... | ... | ... | ... | ... | ... | ... | ... | ... | ... |
| 5311 | ABC CLOTHING STORE | LUGGAGE | 180-12 153rd STREET | 718 635-5361 | 60 | 93 | 59 | 101 | 253 | 1,786 | 2,439 |

| TIME OF CALL (610) | DATE OF CALL (615) | CALLER'S ANI (630) |
|---|---|---|
| ⋮ | ⋮ | ⋮ |
| 9:03 am (650) | 2/24/03 | 212 836-7188 |
| 11:08 am (651) | 2/24/03 | 718 779-6503 |
| ⋮ | ⋮ | ⋮ |

FIG. 7
700

| TIME OF CALL (610) | DATE OF CALL (615) | CALLER'S ANI (630) |
|---|---|---|
| ⋮ | ⋮ | ⋮ |
| 11:54 am (753) | 2/24/03 | 201 259-3671 |
| 3:36 pm (754) | 2/24/03 | 347 746-0915 |
| ⋮ | ⋮ | ⋮ |

FIG. 8
800

| NAME OF COMPANY ⌒220 | ADDRESS OF COMPANY ⌒225 | WEEK I CALLS ⌒251 | WEEK II CALLS ⌒259 | TOTAL CALLS ⌒260 | WEEK I PERCENTAGE ⌒261 | WEEK II PERCENTAGE ⌒262 |
|---|---|---|---|---|---|---|
| 870⌒ AAMCO TRANSMISSIONS | 190 WASHINGTON ROAD BOSTON, MASSACHUSETTS 04903 | 1,092 | 231 | 1,323 | 0% | 0% |
| 871⌒ AAMCO TRANSMISSIONS | 370 OCEAN DRIVE SAN DIEGO, CALIFORNIA 94902 | 1,567 | 864 | 2,431 | 43.5% | 274% |

TECHNIQUE FOR ANALYZING INFORMATION ASSISTANCE CALL PATTERNS

FIELD OF THE INVENTION

The invention relates to systems and methods for analyzing patterns of calls for information concerning desired parties, e.g., business entities.

BACKGROUND OF THE INVENTION

It is commonplace that a user who wants to purchase a particular product or service calls an information assistance service for a listing of the business entity offering the product or service. In the information assistance call, the user may be afforded a choice to be connected to the business entity. The user may then be able to elicit from the business entity information concerning, e.g., its business hours, whether the particular product is in stock, etc.

In today's competitive marketplace business entities spend a lot of time and effort to measure the effectiveness of their marketing campaigns and to gain competitive intelligence on their competitors. Mostly such efforts are concentrated on polling customers, counting customers walking into a business establishment, asking them to fill out surveys, collecting information about how many viewers saw a particular TV commercial, etc. While it is imprecise and complicated for business entities to measure their own marketing efforts, it is even more difficult to gather timely competitive intelligence on their competitors.

SUMMARY OF THE INVENTION

The present invention overcomes the prior art limitations by assessing the competitiveness of a business entity vis a vis another business entity by comparing the number of information assistance communications, e.g., information assistance calls, in which connection information, e.g., a telephone listing, for these business entities was requested. Information assistance communications may alternatively comprise data connections, e.g., over the Internet, through which a user may request an entity's connection information. The invention is premised upon a perceived correlation between the number of information assistance communications requesting a business entity's connection information and the callers' interest in its products or services, which in turn correlates to sales of the business entity. The statistics concerning information assistance communications, thus, provide insights into the performance, effectiveness of marketing efforts and sales campaigns, etc. of a business entity vis a vis its competitors.

The connection information concerning an entity is typically maintained in a directory database accessible to an information assistance provider. The information assistance provider here is a third party unaffiliated with the entity listed in the database. An entity may be a for profit, a not-for-profit business organization, or an individual. An entity may comprise more than one department, each with its separate connection information. In an illustrative embodiment, the information assistance system may credit the entity with all of the information assistance calls requesting listings of any of its departments to measure its overall performance. In another embodiment, the information assistance system may consider the calls on a department by department basis to measure individual departments' performance.

More importantly, for example, the performance measure of the entity (department) may be compared with those of other entities (departments) in the same category, e.g., the same geographic area or industry, to gain insights into the competitiveness of the entity in that area or industry. Similarly, the performance measure of the entity (department) may be compared with those of other entities (departments) in different geographic areas belonging to the same company to gain insights into the relative performance of the entity within the company. Management of the entity (department) may then be able to adjust an advertising campaign, sales strategy, business plan, etc. based on such insights.

In addition, the performance measure of the entity (department) may be compared with those of other entities (departments) in the same geographic area, however, providing different products or services. For example, the number of information assistance communications requesting connection information of an entity providing different products or services than, but located in close proximity to, another entity, e.g., in the same shopping mall, may provide insights into their relative appeal to a shopper.

According to the present invention, the assessment of the sales activities of a first entity relative to those of a second entity is a function of the respective numbers of information assistance communications requesting connection information concerning the first and second entities. Such a function may involve a comparison, a ratio, a percentage, etc.

BRIEF DESCRIPTION OF THE DRAWING

Further objects, features and advantages of the invention will become apparent from the following detailed description taken in conjunction with the accompanying drawings showing illustrative embodiments of the invention, in which.

DETAILED DESCRIPTION

The invention is directed to assessing the viability of a business entity based on statistics concerning information assistance calls requesting the listing of the same. The invention is premised upon a perceived correlation between the number of calls requesting a business entity's listing and the callers' interest in its products or services, which in turn correlates to sales of the business entity. In accordance with an embodiment of the invention, data is collected and analyzed which concerns information assistance calls requesting listings of different business entities which may belong to the same industry or company to gain insights into their comparative performance.

A business entity may have more than one phone number listed in a directory database, which is maintained by, or accessible to, an information assistance system. For example, ABC Clothing Store may have one phone number for men's clothing department, one for women's clothing department, one for children's clothing department, one for luggage department, etc. In an illustrative embodiment, the information assistance system may credit the business entity with all of the information assistance calls requesting listings of any of its departments to measure its overall performance. In another embodiment, the information assistance system may consider the calls on a department by department basis to measure individual departments' performance. More importantly, for example, the performance measure of the business entity (department) may be compared with those of other business entities (departments) in the same geographic area belonging to the same industry to gain insights into the competitiveness of the business entity in that area. Similarly, the performance measure of the business entity (department) may be compared with those of other business entities (departments) in different geographic areas belonging to the same company to gain insights into the relative performance of the business entity within the company. Management of the business entity (department) may then be able to adjust an advertising campaign, sales strategy, business plan, etc. based on such insights.

Figure 1:
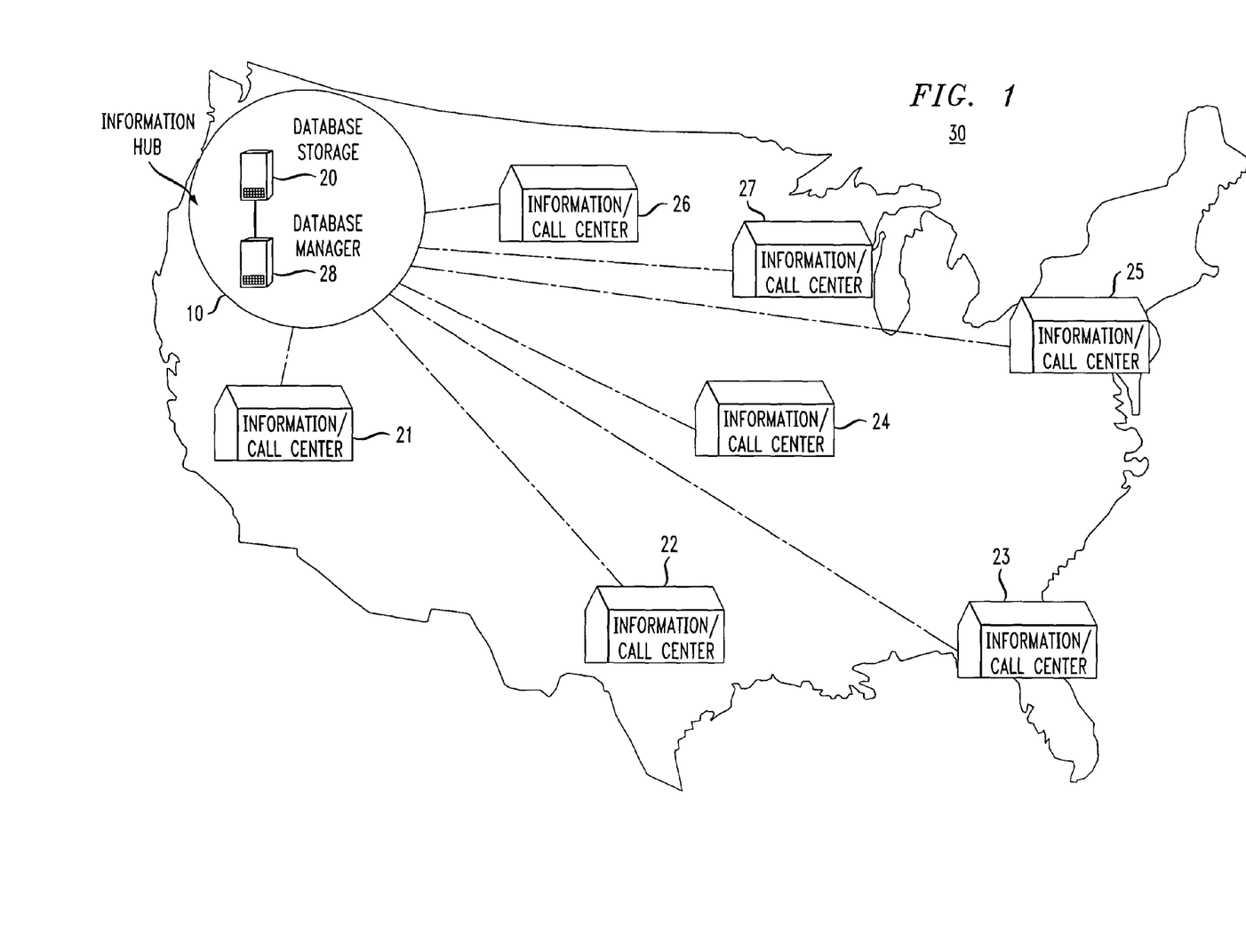
FIG. 1 illustrates an information assistance system including information/call centers in accordance with the invention.

FIG. 1 illustrates an information assistance system embodying the principles of the invention for providing, inter alia, an analysis of the information assistance calls to multiple competing business entities. This communication system includes wide area network (WAN) 30 covering an extensive area. WAN 30 may be an Internet-based network such as the World Wide Web or a private intranet based network. WAN 30 connects operators dispersed throughout a wide coverage area in information/call centers 21 through 27. One or more information hubs 10 are also included in WAN 30. An information hub 10 includes one or more database managers 28 which are accessible by the operators in the system, and one or more database storages 20 in which the databases and reports in accordance with the present invention, e.g., an information assistance calls database, single-entity calls report, or multi-company calls report, may be stored and maintained. (Such databases may also be duplicated and stored locally at one or more of the information/call centers.)

Figure 2:
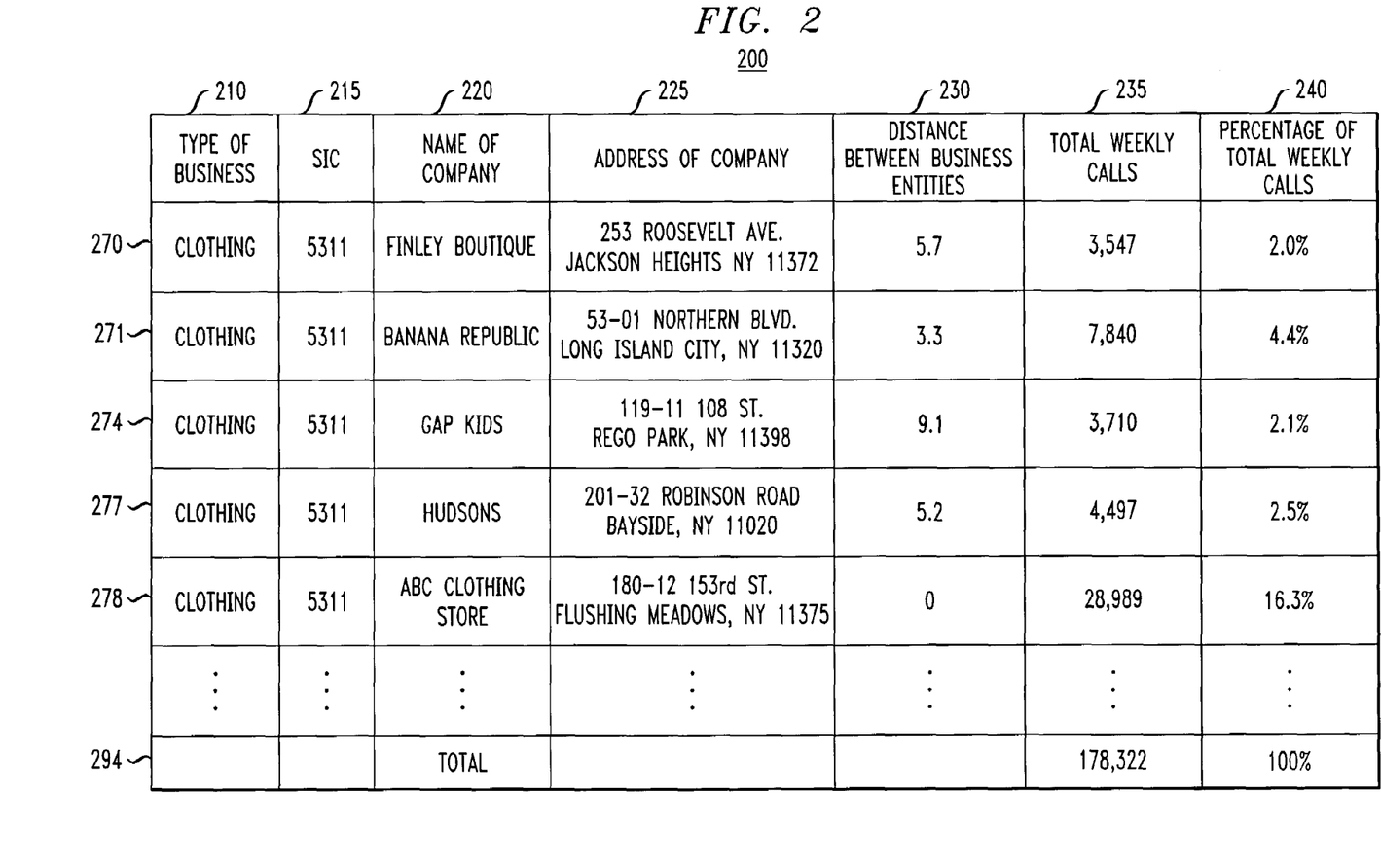
FIG. 2 illustrates a multi-company calls report in accordance with the invention.

FIG. 2 illustrates an example of such a multi-company calls report 200 in accordance with the invention. In this example, report 200 was commissioned by ABC Clothing Store for its store located at 180-12 153rd Street, Flushing Meadows, N.Y. 11375 and for competing clothing stores within a ten-mile radius. All such clothing stores belong to the same Standard Industrial Classification ("SIC") Code "5311" for clothing stores.

In the instant example, multi-company calls report 200 results from an analysis of a pattern of information assistance calls for the last week of February 1993 (February 22 through February 28). Report 200, illustrated in FIG. 2, contains, among others, five call records for various business entities in the ten-mile radius of the ABC Clothing Store in question. Each call record in report 200 illustratively includes seven fields. Type of Company field 210 of all call records in report 200 contains "Clothing" to indicate that all the competing business entities for which information assistance call patterns are analyzed in report 200 relate to the clothing retail business. SIC field 215 contains the SIC code for the corresponding business entity, e.g., "5311", which stands for clothing stores. Name of Company field 220 contains the name of the business entity in each call record, e.g., "Finley Boutique" in call record 270, "ABC Clothing Store" in call record 278, etc. Address of Company field 225 contains the address of the business entity in each call record, e.g., "253 Roosevelt Ave., Jackson Heights, N.Y. 11372" for "Finley Boutique" in call record 270. Distance Between Business Entities field 230 contains a measure of a distance in miles between the business which requested this service, e.g., ABC Clothing Store located at 180-12 153rd Street, Flushing Meadows, N.Y. 11375, and other competing business entities in report 200. In this instance, field 230 of call record 270 contains 5.7 miles, which is the distance between ABC Clothing Store located at 180-12 153rd Street, Flushing Meadows, N.Y. 11375 and Finley Boutique located at 253 Roosevelt Ave., Jackson Heights, N.Y. 11372. Field 230 of call record 278 contains 0 miles, which indicates that business stored in Name of Company field 220 of call record 278, i.e., ABC Clothing Store, is the one which commissioned report 200.

Total Weekly Calls field 235 contains the total number of all information assistance calls requesting phone numbers assigned to the corresponding business entity in report 200 during a given period of time. Percentage of Total Weekly Calls field 240 contains the percentage of the number of all information assistance calls requesting any phone numbers assigned to a corresponding business entity in report 200 during a given period of time relative to all information assistance calls made to all business entities in report 200.

Total Weekly Calls field 235 of call record 270 contains "3,547" which represents the total number of information assistance calls during which any phone number of Finley Boutique was requested in the last week of February 1993. Percentage of Total Weekly Calls field 240 of call record 270 contains 2.0% which represents the percentage of 3,547 calls (registered in Total Weekly Calls field 235) made to "Finley Boutique" during the last week of February 1993 out of total calls of 178,322 (registered in Total Weekly Calls field 235 of call record 294) made to all business entities in report 200.

Figure 3:
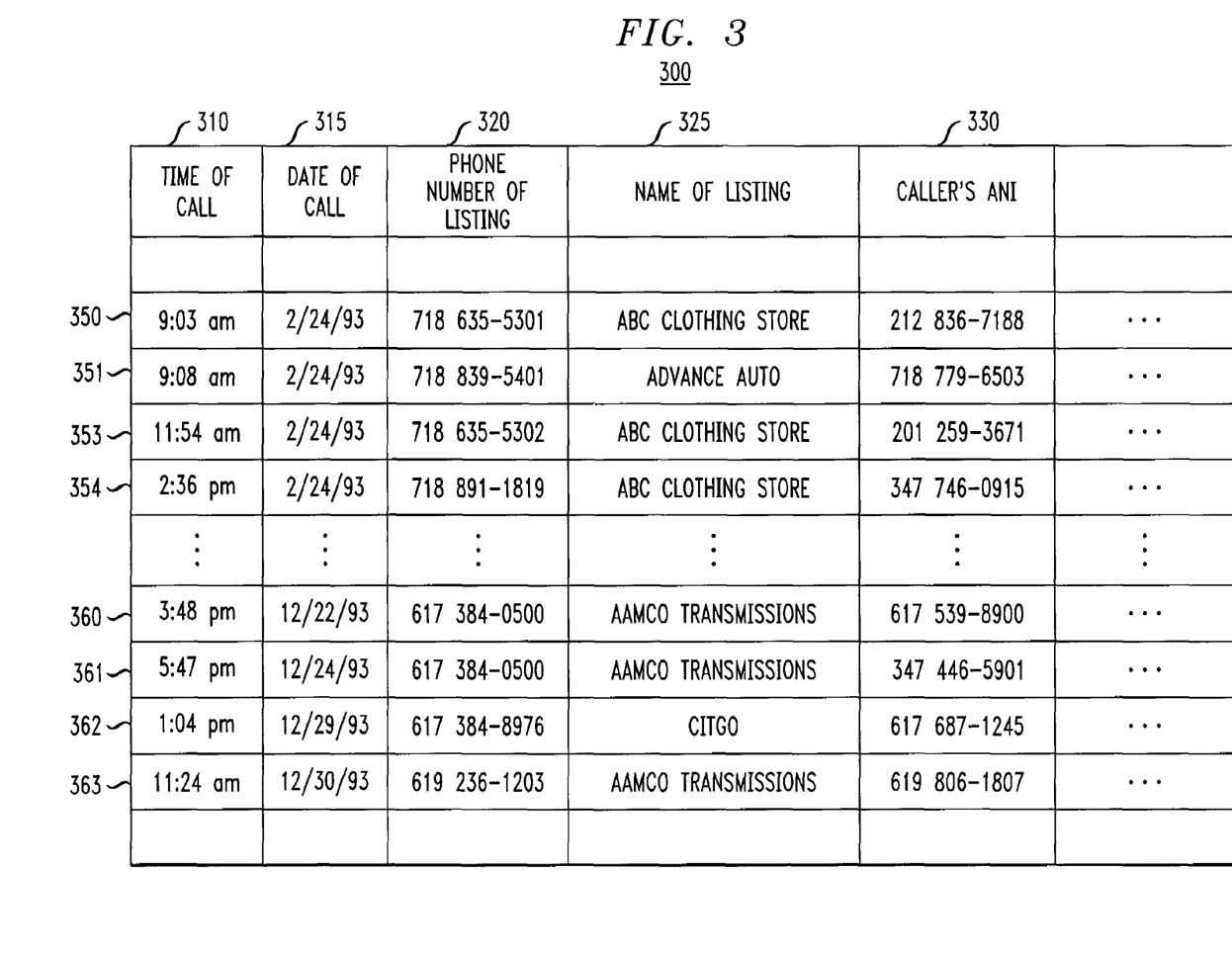
FIG. 3 illustrates an information assistance call record and information assistance calls database in accordance with the invention.

Database manager 28 compiles multi-company calls report 200 illustrated in FIG. 2 from information assistance call records contained in information assistance calls database 300 illustrated in FIG. 3. After completion of every information assistance call, database manager 28 creates an information assistance call record, which includes, among others, five fields, for the just completed information assistance call. Time of Call field 310 contains the time an information assistance call was received. Date of Call field 315 contains the date an information assistance call was placed. Phone Number of Listing field 320 contains the phone number of the listing requested by an information assistance caller. Name of Listing Field 325 contains the name of the listing requested by an information assistance caller. Caller's ANI field 330 contains the phone number from which a caller placed an information assistance call.

For example, information assistance call record 350 is for the information assistance call placed by a caller from "212 836-7188" (registered in Caller's ANI field 330) at "9:03 am" (registered in Time of Call field 310) on "Feb. 24, 1993" (registered in Date of Call field 315) requesting a listing for "ABC Clothing Store" (registered in Name of Listing field 325), which resulted in retrieval of "718 635-5301" (registered in Phone Number of Listing field 320).

Figure 4A:
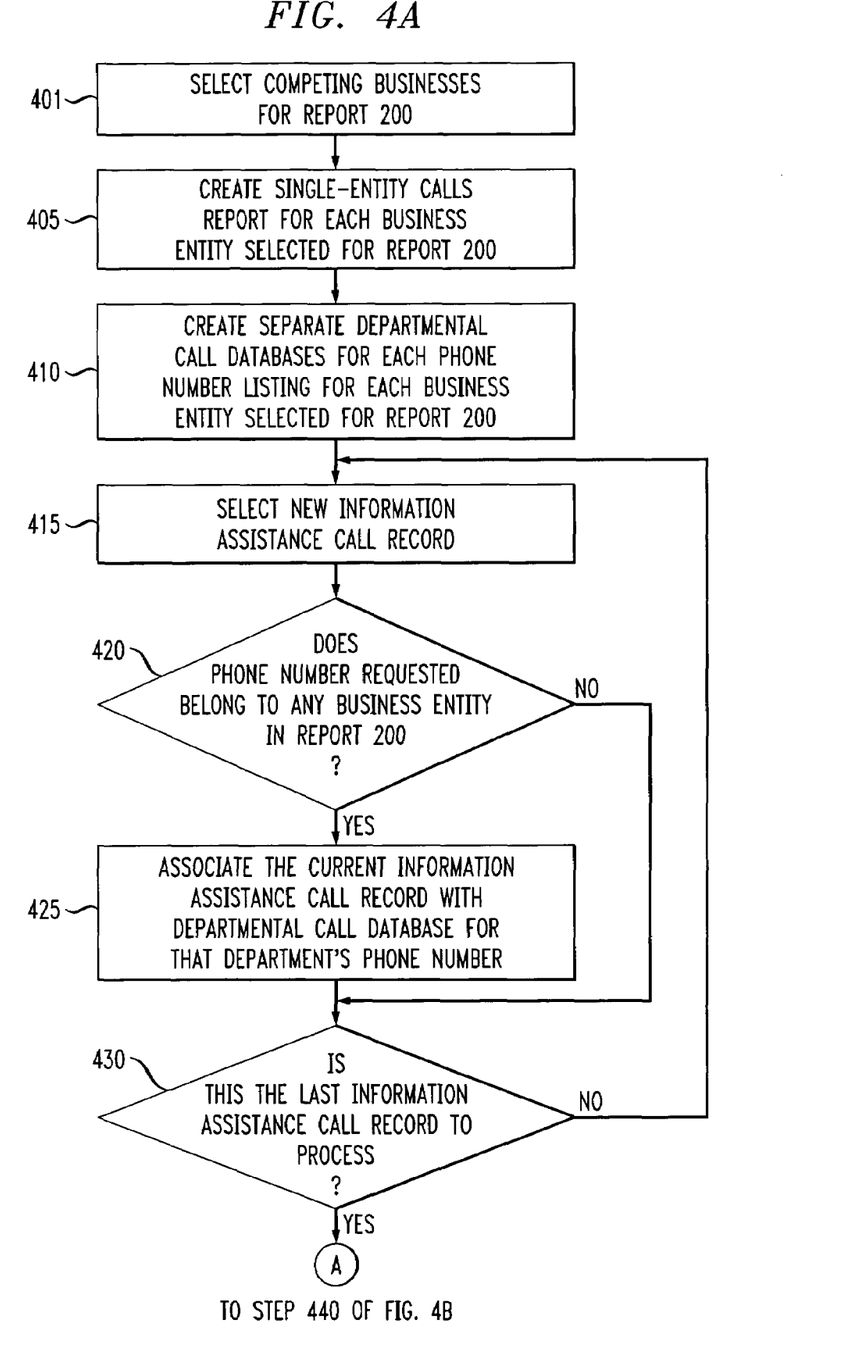
FIGS. 4A and 4B are flow charts jointly depicting a routine for creating a multi-company calls report from information contained in an information assistance calls database in accordance with the invention.
Figure 4B:
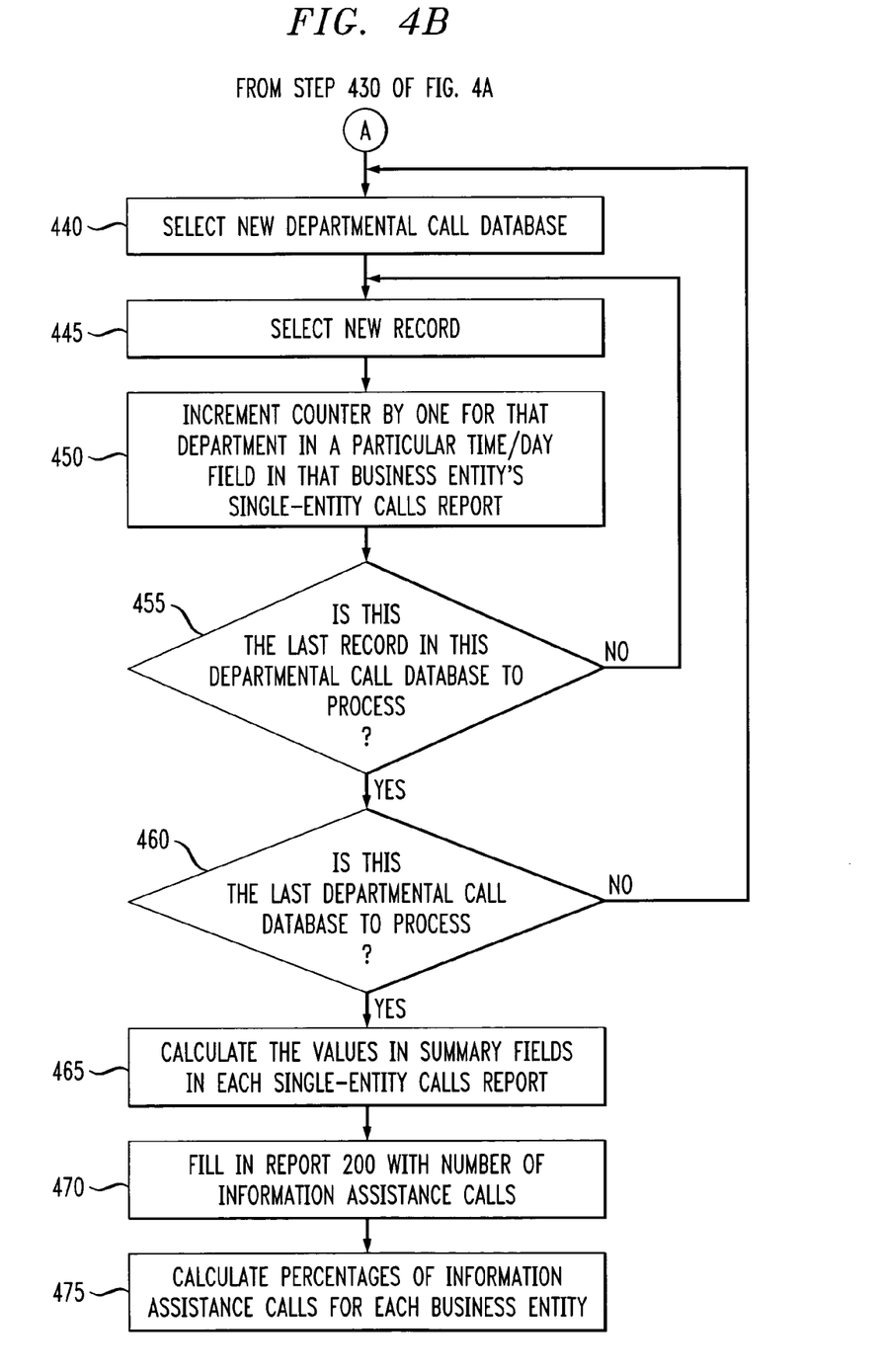

FIGS. 4A and 4B jointly depict a routine executed by database manager 28 to compile multi-company calls report 200 from information assistance call records stored in information assistance calls database 300. In step 401, database manager 28 selects the competing business entities whose call patterns would be analyzed in report 200. The system of the present invention provides a number of ways that business entities can be selected for inclusion in report 200. In one example, a business entity requesting that report 200 be compiled, e.g., ABC Clothing Store, specifies the names and addresses of the business entities to be included in report 200. In another example, the requesting business entity specifies a list of SIC codes and the geographic constraints, e.g., one or more zip codes, or a starting point and a radius therefrom.

In the instant example, ABC Clothing Store requested that all business entities belonging to SIC 5311 and located within a ten-mile radius of its store located at 180-12 153rd Street, Flushing Meadows, N.Y. 11375 be included in report 200. Database manager 28 using well known techniques, and in particular services of MapQuest Inc., determines what telephone area codes business entities within ten miles of 180-12 153rd Street, Flushing Meadows, N.Y. 11375 could belong to, i.e., 718, 516, 631, 212, 917, 347, etc., and then searches the database of all listings in these area codes for all business entities within ten miles of 180-12 153rd Street, Flushing Meadows, N.Y. 11375 whose SIC code is 5311. As a result, database manager 28 identifies business entities satisfying these criteria, and creates call records in multi-company calls report 200. Database manager 28 populates Name of Company field 220, Address of Company field 225, Distance Field 230, Type of Business field 210, and SIC field 215 of the call records in report 200, with names, addresses, distance from the requesting business entity, type of business and SIC code of the identified business entities, respectively.

Figure 5:
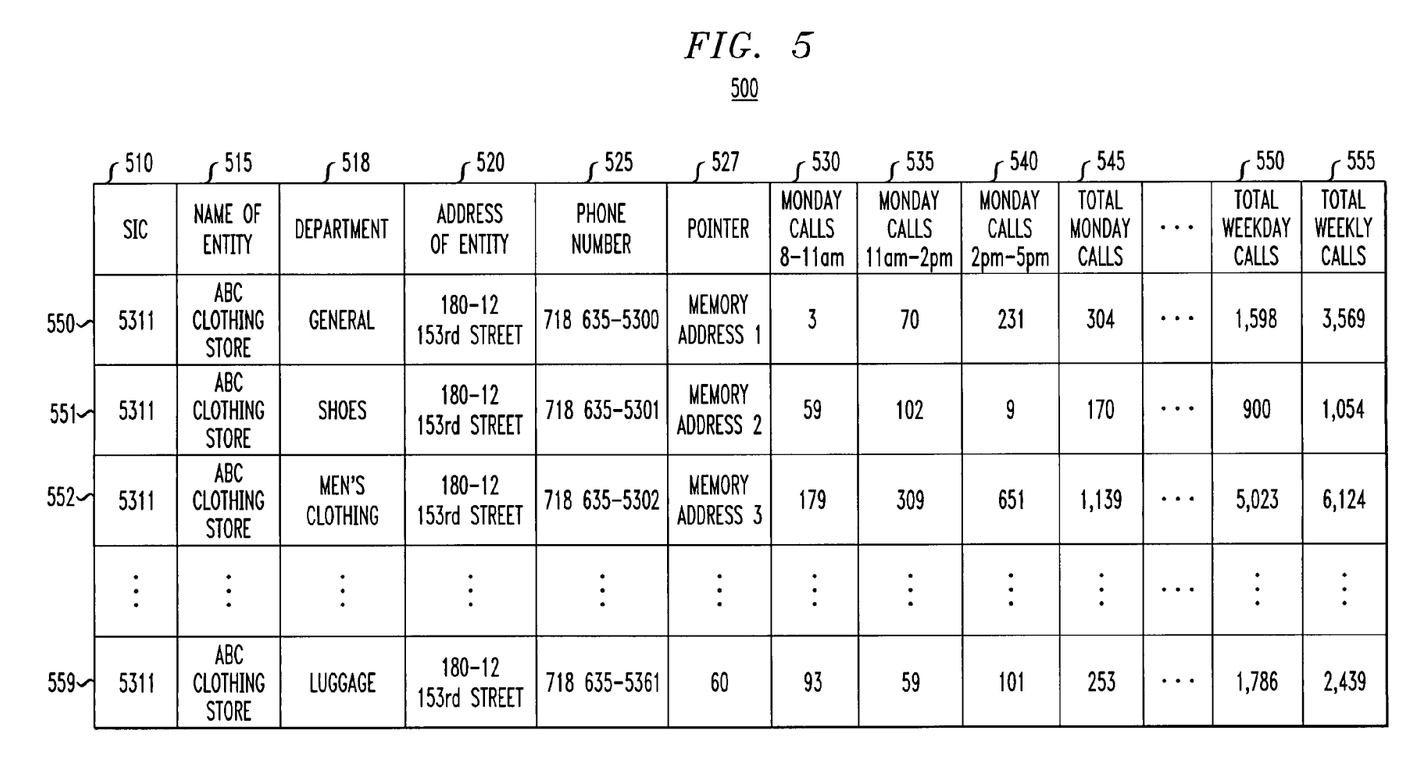
FIG. 5 illustrates a single-entity calls report in accordance with the invention.

In step 405, database manager 28 creates single-entity calls report 500 for each of the business entities included in report 200. FIG. 5 illustrates a single-entity calls report 500 for ABC Clothing Store which contains call summary records for every phone number listed in the directory database for the particular store located at 180-12 153rd Street, Flushing Meadows, N.Y. 11375. SIC field 510 of call summary records 550 through 559 contains the SIC code "5311" for clothing stores. Name of Entity field 515 contains the name of the business entity. Address of Entity field 520 contains the address of the business entity. Name of Entity field 515 of call summary records 550 through 559 contains "ABC Clothing Store." Since all of the departments of this store are located in the same building, Address of Entity field 520 of call summary records 550 through 559 contain the same address—"180-12 153rd Street, Flushing Meadows, N.Y. 11375." Department field 518 contains the name and Phone Number field 525 contains the phone number of the department within the business entity in report 500. Pointer field 527 contains the memory address of the departmental call database containing records of information assistance calls where callers requested this department's phone number. In the instant example, call summary record 551 is for the shoes department (registered in Department field 518) having the phone number of "718-635-5301" (registered in Phone Number field 525) and associated departmental call database 600 illustrated in FIG. 6 and described in detail below, linked by memory address 2 stored in Pointer field 527.

The rest of the fields in single-entity calls report 500 collect information about information assistance calls made to this business entity. Monday Morning Calls field 530 serves as a counter of the number of information assistance calls requesting a phone number of the corresponding department within the business entity between 8:00 and 11:00 a.m. on Monday. Monday Morning Calls field 530 of call summary record 550 contains a value "3" which means that there were three information assistance calls requesting the general phone number of ABC Clothing Store between 8:00 a.m. and 11:00 a.m. on Monday, Feb. 24, 1993.

Monday Afternoon Calls field 535 serves as a counter of the information assistance calls requesting a phone number of the corresponding department within the business entity between 11:00 a.m. and 2:00 p.m. on Monday. Monday Afternoon Calls field 535 of call summary record 559 contains a value "59" which means that there were 59 information assistance calls requesting the luggage department's phone number, "718-635-5361" (registered in Phone Number field 525) between 11:00 a.m. and 2:00 p.m. on Monday, Feb. 24, 1993.

Monday Evening Calls field 540 serves as a counter of the number of information assistance calls requesting a phone number of the corresponding department within the business entity between 2:00 p.m. and 5:00 p.m. on Monday. Monday Evening Calls field 540 of call summary record 551 is 9 which means that there were 9 information assistance calls requesting the shoes department's phone number between 2:00 p.m. and 5:00 p.m. on Monday, Feb. 24, 1993.

Total Monday Calls field 545 serves as a counter of the information assistance calls made on Monday to each departmental phone number. Total Monday Calls field 545 is a sum of the counters in Monday Morning Calls field 530, Monday Afternoon Calls field 535 and Monday Evening Calls field 540. In the instant example, Total Monday Calls field 545 of call summary record 550 shows 304 information assistance calls in which users requested the general phone number of ABC Clothing Store, and which is a sum of 3 calls in Monday Morning Calls field 530, 70 calls in Monday Afternoon Calls field 535, and 231 calls in Monday Evening Calls field 540.

Total Weekdays Calls field 550 serves as a counter of the number of information assistance calls requesting a phone number of the corresponding department's phone number during all weekdays. Total Weekdays Calls field 550 contains a sum of the numbers of calls in Total Monday Calls field 545 with Total Tuesday Calls field (not shown), Total Wednesday Calls field (not shown), Total Thursday Calls field (not shown) and Total Friday Calls field (not shown). Total Weekdays Calls field 550 of call summary record 552 contains a value "5,023" which means that there were 5,023 information assistance calls requesting the phone number of men's clothing department during the weekdays of the week of Feb. 24, 1993.

Total Weekly Calls field 555 serves as a counter of the information assistance calls requesting a phone number of the corresponding department's phone number during every day of the week. Total Weekly Calls field 555 contains a sum of the numbers of calls in Total Weekdays Calls field 550 and Total Weekend Calls field (not shown). Total Weekly Calls field 555 of call summary record 559 is 2,439.

Figure 6:
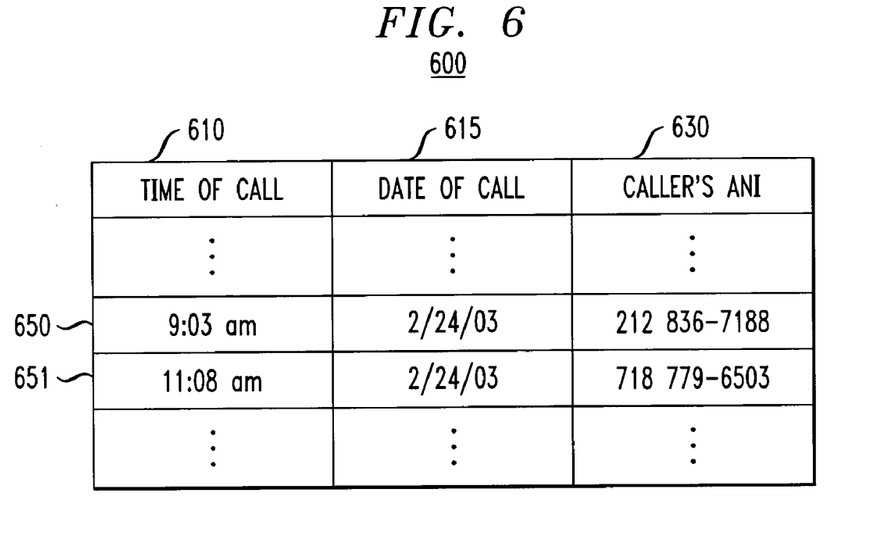
FIG. 6 illustrates a departmental call database in accordance with the invention.

Continuing with the routine depicted in FIG. 4A, in step 410, database manager 28 creates separate departmental call databases for each phone number of each business entity selected for report 200. Departmental call databases contain records of the information assistance calls where a caller requested this department's phone number. FIG. 6 illustrates departmental call database 600 for ABC Clothing Store's shoes department's phone number "718-635-5301". Since departmental call database 600 contains records of information assistance calls where users requested the same phone number, a record of departmental call database 600 does not need to contain the phone number, name and address of the requested listing. Rather such record in this instance includes Caller's ANI field 630, Time of Call field 610, and Date of Call field 615. For example, record 650 in departmental call database 600 pertains to an information assistance call placed by a caller from "212 836-7188" (in Caller's ANI field 630) at "9:03 am" (registered in Time of Call field 610) on "Feb. 24, 1993" (registered in Date of Call field 615).

Figure 7:
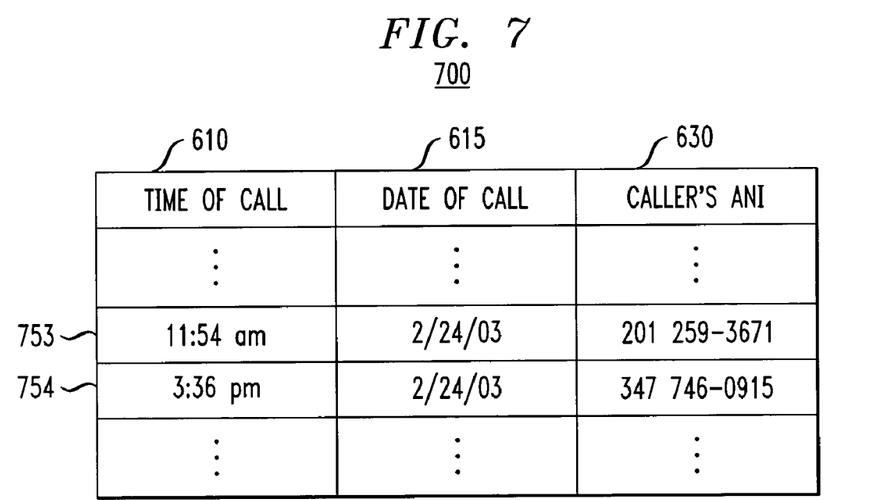
FIG. 7 illustrates a departmental call database in accordance with the invention.

FIG. 7 illustrates departmental call database 700 for ABC Clothing Store's men's clothing department's phone number "718-635-5302". Record 753 pertains to an information assistance call placed by a caller from "201-259-3671" (registered in Caller's ANI field 630) at "11:54 am" (registered in Time of Call field 610) on "Feb. 24, 1993" (registered in Date of Call field 615).

In step 415, database manager 28 accesses information assistance calls database 300, which stores information assistance call records for all information assistance calls made in the last week of February 1993 requesting any of the listings in area codes where business entities within 10 miles of 180-12 153$^{rd}$ Street, Flushing Meadows, N.Y. 11375 are located, e.g., 718, 516, 631, 212, 917, 347, etc. In step 415, database manager 28 selects a new information assistance call record for processing. In this example, database manager 28 selects information assistance call record 350.

In step 420, database manager 28 determines whether "718-635-5301," the requested phone number in information assistance calls record 350, belongs to any of the business entities in report 200. Database manager 28 does that by comparing "718-635-5301," with every phone number stored in Phone Number field 525 of every single-entity calls report for each of the business entities in report 200. Database manager 28 matches "718-635-5301", with Phone Number field 525 of call summary record 551 for ABC Clothing Store's shoes department.

In step 425, database manager 28 retrieves departmental call database 600 associated with ABC Clothing Store's shoes department based on value in Pointer field 527 indicating its memory address. Then, database manager 28 associates information assistance call record 350 with departmental call database 600 by adding a new record to it and copying information from information assistance call record 350 into this new record 650. In step 430, database manager 28 checks whether information assistance call record 350 is the last information assistance call record in information assistance calls database 300.

In this example it is not, and database manager 28 proceeds to step 415 to select a new information assistance call record. In this instance, database manager 28 selects information assistance call record 351 and in step 420, compares "718-839-5401", the phone number requested in this information assistance call (stored in Phone Number of Listing field 320 of information assistance call record 351), with each of the phone numbers stored in Phone Number field 525 of every single-entity calls report for each of the business entities in report 200. In this example, phone number of Advance Auto is not stored in any of them because Advance Auto is not one of the business entities analyzed in report 200. Therefore, database manager 28 proceeds to step 430. Since information assistance call record 351 is not the last one in information assistance calls database 300, database manager proceeds to step 415 and selects information assistance call record 353.

In step 420, database manager 28 determines that phone number requested in this information assistance call matches ABC Clothing Store's men's clothing department's phone number (stored in Phone Number field 525 of call summary record 552). In step 425, database manager 28 retrieves departmental call database 700 associated with ABC Clothing Store's men's clothing department based on value in Pointer field 527 indicating its memory address. Then database manager 28 associates information assistance call record 353 with departmental call database 700 by adding a new record to it and copying information from information assistance call record 353 into this new record 753. Then database manager 28 proceeds to step 430 and so on as described above.

Assuming that database manager 28 processed all information assistance call records in information assistance calls database 300, database manager 28 goes to step 440 of FIG. 4B. In step 440, database manager 28 selects a new departmental call database from departmental call databases associated with each listed phone number for each business entity included in report 200. For example, say database manager 28 selected departmental call database 600 associated with ABC Clothing Store's shoes department's phone number (718) 635-5301. In step 445, database manager 28 selects a new record from departmental call database 600, say, record 650. In step 450, database manager 28 increments by one the counter in Monday Morning Calls field 530 of call summary record 551 because information assistance call of record 650 was made at 9:03 a.m. (stored in Time of Call field 610) and Monday Morning Calls field 530 becomes "4" (not shown).

In step 455, database manager 28 checks whether this is the last record in departmental call database 600. If so, database manager 28 proceeds to step 460. In step 460, database manager 28 checks whether departmental call database 600 is the last departmental call database. Otherwise, database manager 28 goes to step 440 and selects a new departmental call database, say, departmental call database 700 associated with ABC Clothing Store's men's clothing department's phone number "718-635-5302". In step 445, database manager 28 selects a new record from departmental call database 700, say record 753. In step 450, database manager 28 increments by one Monday Afternoon Calls field 535 because information assistance call of record 753 was made at 11:54 a.m. (stored in Time of Call field 710). In step 455, database manager 28 checks whether this is the last record in departmental call database 700. If so, database manager 28 proceeds to step 460. In step 460, database manager 28 checks whether departmental call database 700 is the last departmental call database. Otherwise, database manager 28 goes to step 465.

Assuming that database manager 28 processed all departmental call databases, database manager 28 proceeds to step 465 to calculate the values in summary fields of all single-entity calls reports for all the business entities included in report 200. For example, in single-entity calls report 500, database manager 28 would calculate the values for Total Monday Calls field 545, . . . , Total Friday Calls field (not shown), Total Weekday Calls field 550, Total Weekend Calls field (not shown), Total Weekly Calls field 555. The procedure for calculating their values is described above in the applicable part of description of FIG. 5.

In step 470, database manager 28 calculates the value of Total Weekly Calls field 235 in report 200 for each business entity. For example, to calculate values of this field for ABC Clothing Store, database manager 28 adds values in Total Weekly Calls field 555 of all call summary records in single-entity calls report 500. In this example, all information assistance callers requested the phone numbers of any of ABC Clothing Store's departments 28,989 times during the last week of February 1993 and database manager 28 stores "28,989" in Total Weekly Calls field 235 of call record 278. After database manager 28 calculates the values of this field for all other business entities in report 200, database manager 28 proceeds to step 475.

In step 475, it calculates the percentage of calls for each business entity relative to the total number of calls for all business entities. Database manager 28 adds values in Total Weekly Calls field 235 for call records 270 through 293 and stores the resulting number "178,322" in the same field of call record 294. Then, database manager 28 divides "28,989," the value of Total Weekly Calls field 235 of call record 278, by "178,322," expresses this result as a percentage, and stores "16.3%" in Percentage of Total Weekly Calls field 240 of call record 278. This means that total information assistance calls requesting the phone numbers of any of ABC Clothing Store's departments with listed phone numbers represent 16.3% of all information assistance calls requesting the phone numbers of any of its competitors included in report 200.

In addition to analyzing information assistance calls patterns for competing business entities belonging to different companies, the system of the present invention provides tools for analysis of information assistance calls patterns for different business entities of the same company, e.g., different Walmart stores, different McDonald's restaurants, etc. The system in accordance with the present invention also can analyze information assistance calls patterns on a departmental level within business entities belonging to the same company as long as each department has a separately listed phone number. This departmental level analysis is useful for companies trying to measure performance of the same department at different business entities and allocate business resources, e.g., capital, employees, hardware, etc., based on the measures obtained. For example, a chain store operator may decide to close a particular department within a particular store if it does not generate sufficient level of sales and customers' interest as reflected in the number of information assistance calls when compared with same department at other locations.

By way of example, let's say Aamco Transmissions wants to analyze how several of its business entities are doing. For this analysis Aamco selected two of its business entities, referred to as shops—one in Boston, Mass. and the other one in San Diego, Calif. and requested a call pattern analysis for the last two weeks of December 1993. In this example, both shops have only one department and thus have only one listed phone number.

Figure 8:
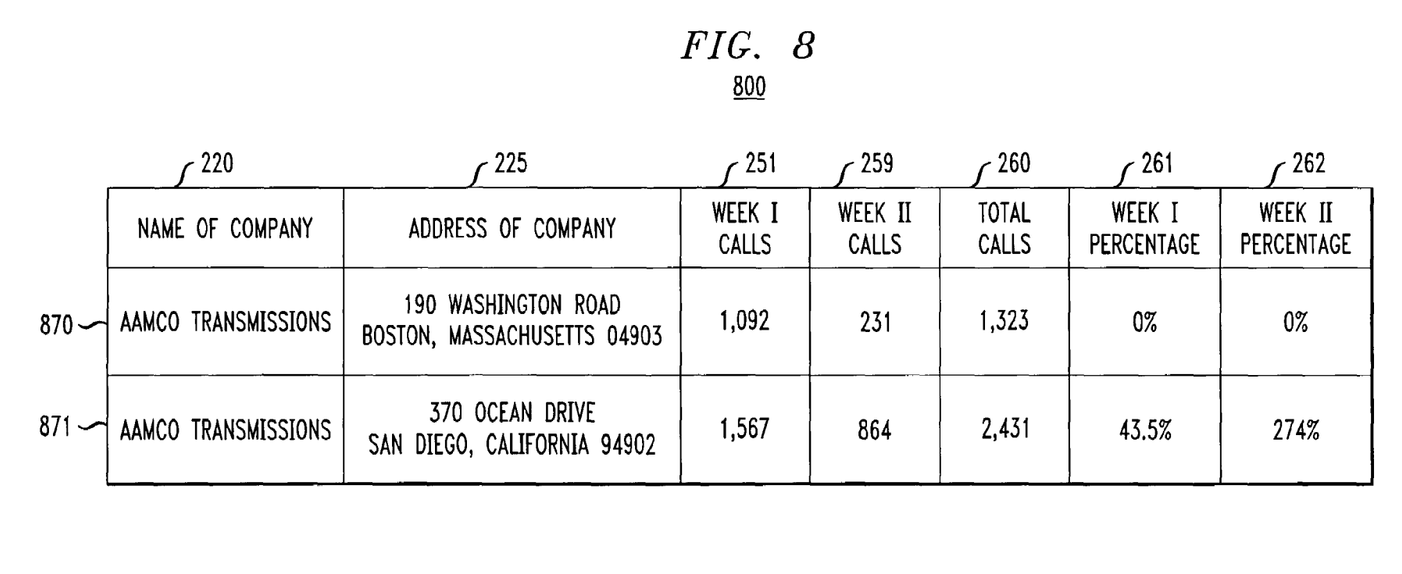
FIG. 8 illustrates a single-company calls report in accordance with the invention.

Database manager 28 compiles the requested report by executing the routine jointly depicted in FIGS. 4A and 4B. In step 401, database manager 28 creates single-company calls report 800 for Aamco and includes two Aamco's shops in it. Call record 870 is for the Boston, Mass. shop located at 190 Washington Road, Boston, Mass. 04903 (registered in Address of Company field 225). Call record 871 is for its San Diego shop located at 370 Ocean Drive, San Diego, Calif. 94902 (registered in Address of Company field 225). Since both shops belong to Aamco, "Aamco" is stored in Name of Company field 220 of both call records 870 and 871. Report 800 does not contain Type of Business field 210, SIC field 215 and Distance Between Business Entities field 230 because Aamco limited its call pattern analysis to two business entities of its own and thus there is no need for the system of the present invention to select competing business entities by SIC code. Since the two shops are located on different coasts of the U.S., Distance field 230 is meaningless in this context, too. Week I Calls field 251 serves as a counter for information assistance calls requesting the phone number for the corresponding Aamco's shop during week I of the analysis—Dec. 17–23, 1993. Week II Calls field 259 serves as a counter for all information assistance calls requesting the phone number for the corresponding Aamco's shop during week II of the analysis—Dec. 24–31, 1993. Total Calls field 260 serves as a counter for all information assistance calls requesting the phone number for the corresponding Aamco's shop made during the last two weeks of December 1993. Week I Percentage field 261 expresses as a percentage the number of calls of one Aamco shop against the calls to the Aamco shop chosen as a base for week I. Week II Percentage field 262 expresses as a percentage the number of calls of one Aamco shop against the calls to the Aamco shop chosen as a base for week II.

In this case, database manager 28 does not execute step 405 because there is no need to create single-entity calls reports for the two Aamco shops because each of them has only one listed phone number, and the analysis requested by Aamco focuses on just the number of calls per week without further breakdown into days or hours. In step 410, database manager 28 creates two departmental call databases (not shown) for the Boston and San Diego shops. In steps 415 through 430, database manager 28 processes information assistance call records stored in information assistance calls database 300. As a result, information assistance call records 360 and 361 become associated with departmental call database for Aamco's Boston shop and information assistance call record 363 becomes associated with departmental call database for Aamco's San Diego shop. Information assistance call record 362 is ignored because it was not connected to either of the Aamco shops being analyzed.

In steps 440 through 460 depicted in FIG. 4B, database manager 28 processes the information assistance call records contained in the two departmental call databases for Aamco's Boston and San Diego shops to calculate the number of connections during each of the last two weeks in December 1993. In this example, the information assistance call described in information assistance call record 360 is added to the counter in Week I Calls field 251 of call record 870 because it was connected to the Boston shop during the week of Dec. 17–23, 1993. The information assistance call described in information assistance call record 361 is added to the counter in Week II Calls field 259 of call record 870 because it was connected to the Boston shop during the week of Dec. 24–31, 1993. The information assistance call described in information assistance call record 363 is added to the counter in Week II Calls field 259 of call record 871 because it was connected to the San Diego shop during the week of Dec. 24–31, 1993.

Since in this instance, database manager 28 did not create single-entity calls reports, database manager 28 in step 470, calculates the value of a summary field Total Calls field 260. Database manager 28 adds the values stored in Week I Calls field 251 ("1,092") and Week II Calls field 259 ("231") in call record 870, and stores 1,323 in Total Calls field 260. In the same manner, database manager 28 calculates 2,431 as the value of Total Calls field 260 of call record 871. In step 475, database manager 28 calculates the values for Week I Percentage field 261 and Week II Percentage field 262. Since Aamco asked that its Boston shop be considered as a base, database manager 28 calculates the difference between week I calls for the two shops ("delta"), divides this delta by the number of calls for the base Boston shop (stored in Week I Calls field 251 of call record 870), expresses this number as a percentage, and stores it in Week I Percentage field 261. In this example, the difference between week I calls of the two shops is 1,567−1,092=475, and 475/1092×100%=43.5% for the San Diego shop (registered in Week I Percentage field 261 of call record 871). The week I percentage for the Boston shop is 0% because it is compared against itself. The values in Week II Percentage fields 262 are calculated in the same manner as the values in Week I Percentage fields 261 described above. Based on this insight that there were 2.7 times more calls requesting the phone number of the San Diego shop than the Boston shop during the last week of December 1993, management of Aamco Transmissions might spend more advertising dollars promoting the Boston shop than the San Diego shop.

It would be appreciated by those skilled in the art that the information assistance calls in a single-entity calls report and a multi-company calls report could be broken down into time groups different from those presented in single-entity calls report 500 and reports 200 and 800. For example, the information assistance calls can be analyzed on a monthly or quarterly basis. In addition, the system of the present invention is capable of comparing patterns of information assistance calls not only on an entity-by-entity basis but also on a department-by-department basis. For example, Wal-Mart can request analysis of only the information assistance calls requesting the phone number of its health and beauty department at a certain business entity, i.e., store, and compare it with the same department of its competitors located within a certain distance of its stores.

The foregoing merely illustrates the principles of the invention. It will thus be appreciated that those skilled in the art will be able to devise numerous other arrangements which embody the principles of the invention and are thus within its spirit and scope.

Finally, information/call centers 21 through 27 are disclosed herein in a form in which various functions are performed by discrete functional blocks. However, any one or more of these functions could equally well be embodied in an arrangement in which the functions of any one or more of those blocks or indeed, all of the functions thereof, are realized, for example, by one or more appropriately programmed processors.

What is claimed is:

1. A method for assessing relative performance concerning at least first and second entities, comprising:
    receiving by an information assistance provider a plurality of information assistance communications, the provider being unaffiliated with the first or second entity;
    determining, of the received information assistance communications, a first number of information assistance communications in which initiators of the first number of information assistance communications requested the information assistance provider to find information concerning connection to the first entity;
    determining, of the received information assistance communications, a second number of information assistance communications in which initiators of the second number of information assistance communications requested from the information assistance provider information concerning connection to the second entity; and
    assessing the relative performance based on a comparison of the first number with the second number.

2. The method of claim 1 wherein the information concerning connection to the first entity includes an identifier associated with a communications device associated with the first entity.

3. The method of claim 1 wherein the information concerning connection to the second entity includes an identifier associated with a communications device associated with the second entity.

4. The method of claim 2 wherein the communications device comprises a telephone and wherein the identifier comprises a phone number.

5. The method of claim 3 wherein the communications device comprises a telephone and wherein the identifier comprises a phone number.

6. The method of claim 1 wherein the received information assistance communications comprise telephone calls.

7. The method of claim 1 wherein the received information assistance communications comprise data connections over a communications network.

8. The method of claim 1 wherein the first entity and the second entity are selected based on one or more criteria.

9. The method of claim 8 wherein the one or more criteria relate to a predetermined geographic location.

10. The method of claim 8 wherein the one or more criteria relate to a selected industry.

11. The method of claim 1 wherein the received information assistance communications are grouped by a time period.

12. The method of claim 1 wherein the first entity and the second entity are affiliated with the same company.

13. The method of claim 1 wherein the first entity and the second entity provide the same type of product or the same type of service.

14. A method for assessing relative sales activities of a first supplier of a first product or service to sales activities of a second supplier of a second product or service, comprising:
    receiving, by an information assistance provider, a plurality of information assistance communications, the provider being unaffiliated with the first supplier or the second supplier, a first subset of the received information assistance communications each including a request to the information assistance provider from an initiator of a communication in the first subset for finding information concerning connection to the first supplier, and a second subset of the received information assistance communications each including a request to the information assistance provider from an initiator of a communication in the second subset for finding information concerning connection to the second supplier;
    determining a first number of communications in the first subset, indicative of the sales activities of the first supplier;
    determining a second number of communications in the second subset, indicative of the sales activities of the second supplier; and
    assessing the relative sales activities as a function of the first number and the second number.

15. The method of claim 14 wherein the information concerning connection to the first supplier includes an identifier associated with a communications device associated with the first supplier.

16. The method of claim 14 wherein the information concerning connection to the second supplier includes an identifier associated with a communications device associated with the second supplier.

17. The method of claim 15 wherein the communications device comprises a telephone and wherein the identifier comprises a phone number.

18. The method of claim 16 wherein the communications device comprises a telephone and wherein the identifier comprises a phone number.

19. The method of claim 14 wherein the received information assistance communications comprise telephone calls.

20. The method of claim 14 wherein the received information assistance communications comprise data connections over a communications network.

21. The method of claim 14 wherein the first product or service includes the second product or service.

22. The method of claim 14 wherein the function of the first number and the second number is a ratio.

23. The method of claim 14 wherein the function of the first number and the second number is a comparison.

24. The method of claim 14 wherein the first supplier and the second supplier are selected based on one or more criteria.

25. The method of claim 24 wherein the one or more criteria relate to a predetermined geographic location.

26. The method of claim 24 wherein the one or more criteria relate to a selected industry.

27. The method of claim 14 wherein the received information assistance communications are grouped by a time period.

28. The method of claim 14 wherein the first supplier and the second supplier are affiliated with the same company.

29. A system for assessing relative performance concerning at least first and second entities, comprising:
    an interface for receiving by an information assistance provider a plurality of information assistance communications, the provider being unaffiliated with the first or second entity; and
    a device for providing data concerning the received information assistance communications, to assess the relative performance based on a comparison of a first number with a second number; wherein the first number is the number of first information assistance communications in which initiators of the first information assistance communications requested the information assistance provider to find information concerning connection to the first entity; wherein the second number is the number of second information assistance communications in which initiators of the second information assistance calls requested the information assistance provider to find information concerning connection to the second entity.

30. The system of claim 29 wherein the information concerning connection to the first entity includes an identifier associated with a communications device associated with the first entity.

31. The system of claim 29 wherein the information concerning connection to the second entity includes an identifier associated with a communications device associated with the second entity.

32. The system of claim 30 wherein the communications device comprises a telephone and wherein the identifier comprises a phone number.

33. The system of claim 31 wherein the communications device comprises a telephone and wherein the identifier comprises a phone number.

34. The system of claim 29 wherein the received information assistance communications comprise telephone calls.

35. The system of claim 29 wherein the received information assistance communications comprise data connections over a communications network.

36. The system of claim 29 wherein the first entity and second entity are selected based on one or more criteria.

37. The system of claim 36 wherein the one or more criteria relate to a predetermined geographic location.

38. The system of claim 36 wherein the one or more criteria relate to a selected industry.

39. The system of claim 29 wherein the received information assistance communications are grouped by a time period.

40. The system of claim 29 wherein the first entity and the second entity are affiliated with the same company.

41. The system of claim 29 wherein the first entity and the second entity provide the same type of product or the same type of service.

42. A system for assessing relative sales activities of a first supplier of a first product or service to sales activities of a second supplier of a second product or service, comprising:
    an interface for receiving, by an information assistance provider, a plurality of information assistance communications, the provider being unaffiliated with the first supplier or the second supplier, a first subset of the received information assistance communications each including a request to the information assistance provider from an initiator of a communication in the first subset for finding information concerning connection to the first supplier, and a second subset of the received information assistance communications each including a request to the information assistance provider from an initiator of a communication in the second subset for finding information concerning connection to the second supplier;
    a first processor for determining a first number of communications in the first subset, indicative of the sales activities of the first supplier; and
    a second processor for determining a second number of communications in the second subset, indicative of the sales activities of the second supplier; wherein the assessing of the relative sales activities is a function of the first number and the second number.

43. The system of claim 42 wherein the information concerning connection to the first supplier includes an identifier associated with a communications device associated with the first supplier.

44. The system of claim 42 wherein the information concerning connection to the second supplier includes an identifier associated with a communications device associated with the second supplier.

45. The system of claim 43 wherein the communications device comprises a telephone and wherein the identifier comprises a phone number.

46. The system of claim 44 wherein the communications device comprises a telephone and wherein the identifier comprises a phone number.

47. The system of claim 42 wherein the received information assistance communications comprise telephone calls.

48. The system of claim 42 wherein the received information assistance communications comprise data connections over a communications network.

49. The system of claim 42 wherein the first product or service includes the second product or service.

50. The system of claim 42 wherein the function of the first number and the second number is a ratio.

51. The system of claim 42 wherein the function of the first number and the second number is a comparison.

52. The system of claim 42 wherein the first supplier and the second supplier are selected based on one or more criteria.

53. The system of claim 52 wherein the one or more criteria relate to a predetermined geographic location.

54. The system of claim 52 wherein the one or more criteria relate to a selected industry.

55. The system of claim 42 wherein the received information assistance communications are grouped by a time period.

56. The system of claim 42 wherein the first supplier and the second supplier are affiliated with the same company.

57. The system of claim 42 wherein the first processor includes the second processor.

* * * * *